Aug. 29, 1950 — W. H. TANKE — 2,520,743
BREAKBACK IMPLEMENT ATTACHMENT FOR TRACTORS
Filed Oct. 24, 1946 — 2 Sheets-Sheet 1

INVENTOR
Willard H. Tanke
BY
ATTORNEY

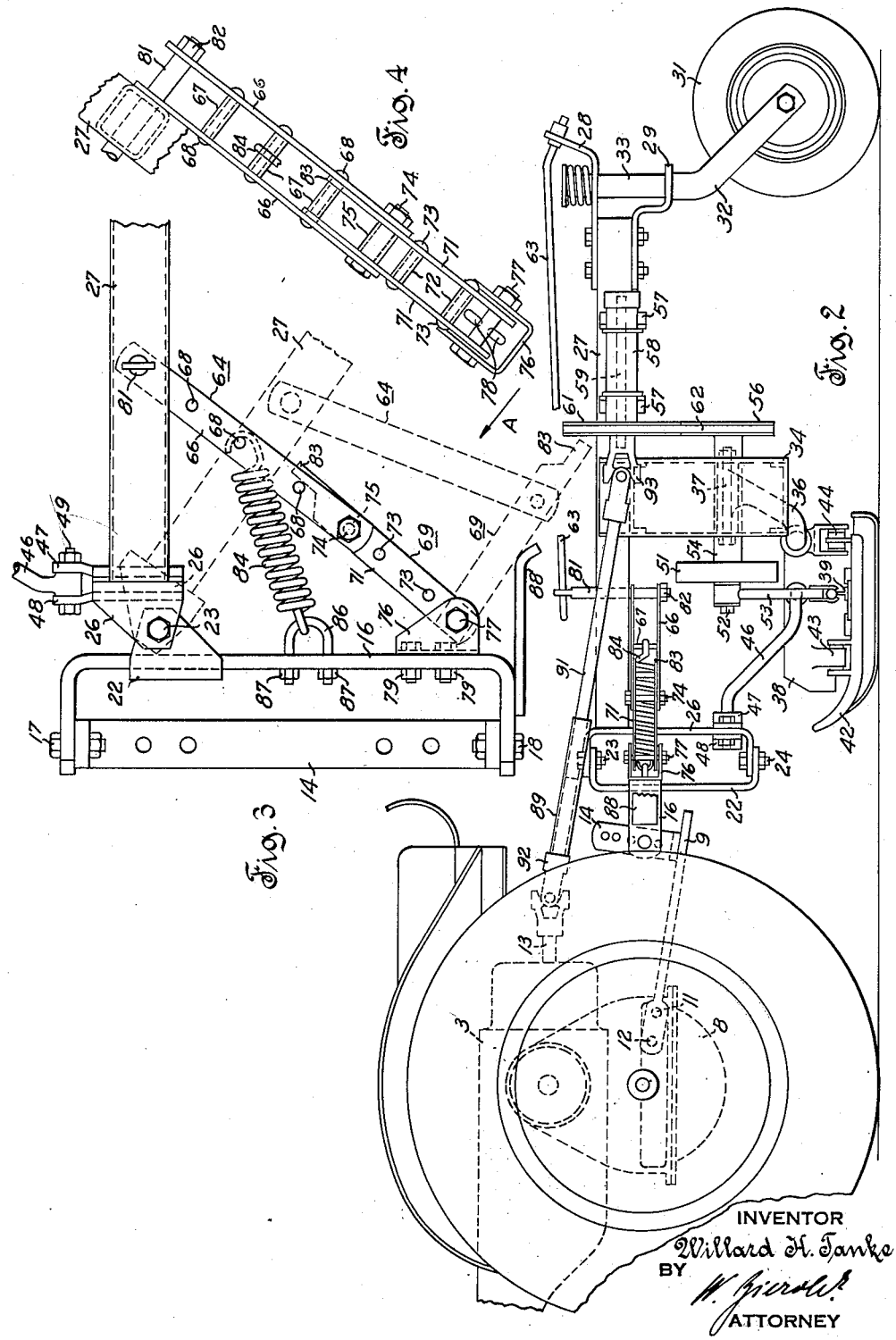

Patented Aug. 29, 1950

2,520,743

UNITED STATES PATENT OFFICE 2,520,743

BREAK-BACK IMPLEMENT ATTACHMENT FOR TRACTORS

Willard H. Tanke, La Crosse, Wis., assignor to Allis-Chalmers Manufacturing Company, Milwaukee, Wis., a corporation of Delaware Application October 24, 1946, Serial No. 705,452

10 Claims. (Cl. 56—25)

This invention relates in general to implement attachments for tractors, and it is concerned more particularly with break-back implements, that is, with implements of the type which under normal operating conditions are retained in a desired working position with reference to a tractor and which may be advanced by the latter in said position, and which are so arranged that under emergency conditions, for instance, when the implement is driven in said working position against an obstruction beyond which it cannot be advanced by the tractor, the implement may pivot rearwardly relative to the tractor, or in other words, break-back from said working position, in order to avoid damage of the implement.

The prior art includes implements of the above mentioned character, particularly tractor mowers, which are equipped with break-back mechanisms of the releasable latch type, that is, of the type in which a latch element and a complementary locking element are arranged to snap into cooperative engagement with each other upon adjustment of the implement into a normally desired working position relative to the tractor, so that the implement may be advanced by the tractor in said normally desired working position, and so that under abnormal working conditions, as when the implement in its normal working position is driven against an obstruction, the latch element and its complementary locking element may snap out of cooperative engagement with each other and thereby release the implement for break-back movement relative to the tractor.

In break-back mechanisms of the mentioned character the latch is apt to trip under a lighter or heavier load, depending on the condition of the mechanism as determined by wear, rust, presence or absence of lubricant, and other causes which are difficult to control. The lack of precision resulting from these causes has been found objectionable, particularly in tractor mowers where it has been observed that when the latch trips too easily, careless operators sometimes resort to tying up the latch with a piece of baling wire or otherwise permanently locking it, so that the latch cannot trip at all. On the other hand, in instances where the latch had become impeded, as by the formation of rust, and the implement was driven against an obstruction, tripping of the latch required such a strong force that the implement was damaged upon striking an obstruction.

Generally, it is an object of the invention to provide an improved break-back arrangement for tractor implements which are horizontally swingable from a working to a non-working position, and more particularly to provide a break-back mechanism for such implements that will function reliably and with a high degree of precision, first, to prevent premature or accidental release of the implement under normal working conditions and, second, to promptly release the implement for break-back movement under emergency conditions as when the implement in its normal working position is driven against an obstruction beyond which it cannot be advanced by the tractor.

A further object of the invention is to provide a break-back mechanism of the above mentioned character which will permit reconditioning of the implement for normal operation, after a break-back, by simply driving the tractor a short distance in reverse.

A further object of the invention is to provide an improved break-back mechanism for tractor implements, which will reliably function in the manner set forth hereinbefore and which, after the implement has been released for break-back movement, will function to dampen such break-back movement and assist return of the implement into its normal working position.

A further object of the invention is to provide an improved tractor mower incorporating a break-back mechanism which will permit movement of the cutting mechanism of the mower from a normal working position into a rearwardly inclined non-working position, and which break-back mechanism will not be apt to develop substantial wear which would require frequent readjustment in order to maintain the break-back mechanism in proper working condition.

These and other objects and advantages are attained by the present invention, various novel features of which will be apparent from the description herein and accompanying drawings disclosing an embodiment of the invention, and will be more particularly pointed out in the claims.

In the drawings:

Fig. 2 is a side view of the tractor and mower assembly shown in Fig. 1;

Fig. 3 is an enlarged top view of a break-back mechanism incorporated in the mower shown in Figs. 1 and 2; and Fig. 4 is a rear view of the mechanism shown in Fig. 3 and taken in the direction of arrow A.

Figure 1:
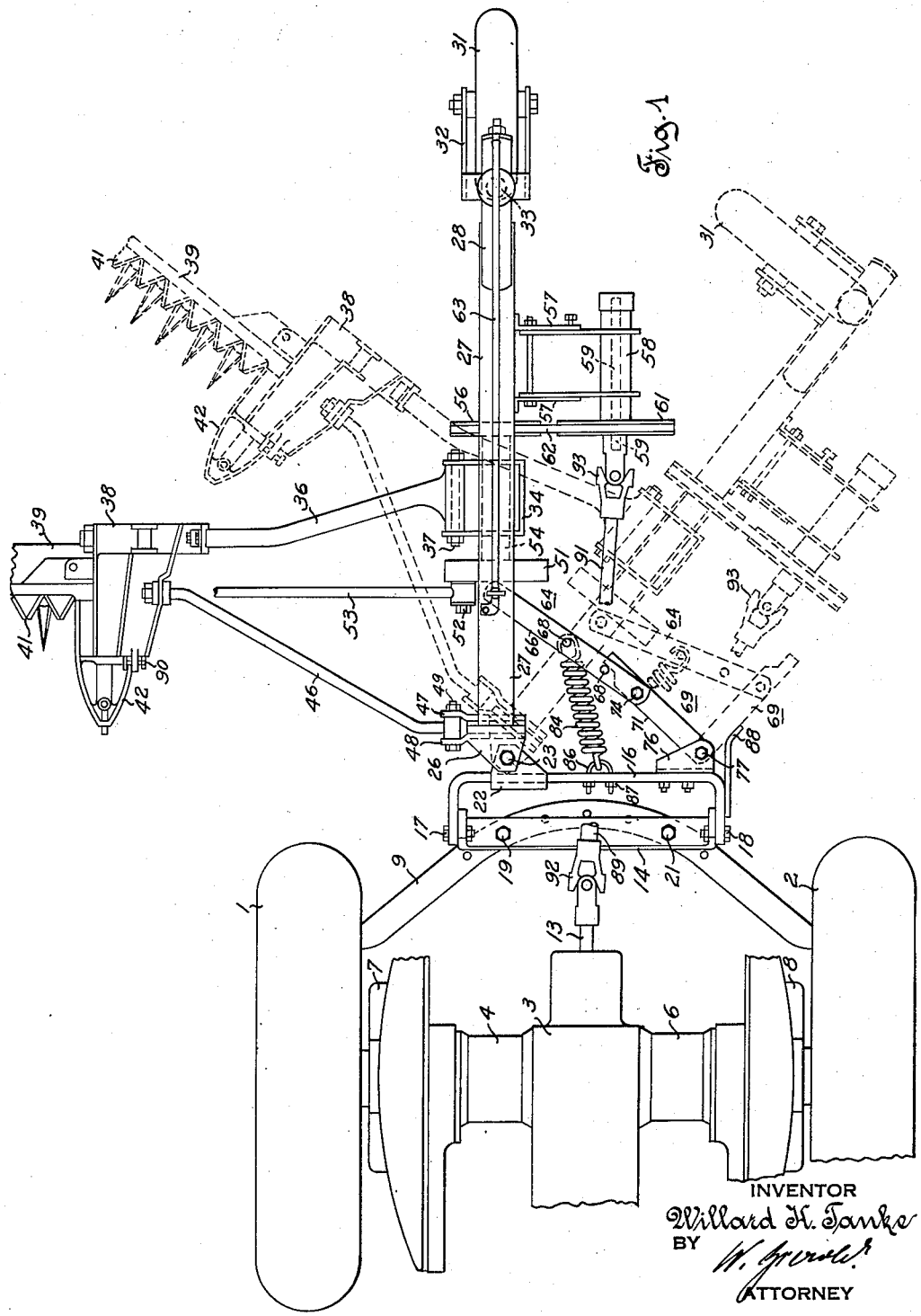
Fig. 1 is a top view of a trailing type break-back mower and of the rear end of a conventional type tractor connected with the mower.

Referring to Figs. 1 and 2, right and left rear wheels 1 and 2, respectively, of a conventional type tractor are mounted on a rear axle structure comprising a central gear casing 3, hollow side arms 4 and 6, and final drive casings 7 and 8 depending, respectively, from the outer ends of side arms 4 and 6, and on which the rear wheels are mounted in axial alignment with each other. A rearwardly arched draw bar 9 is mounted at its opposite ends on the final drive casings 7 and 8, respectively, by means of a pivot pin 11 and a bolt 12, as indicated in Fig. 2, connecting each end of the draw bar with the adjacent final drive casing and securing the draw bar against vertical displacement relative to the tractor body from the position in which the draw bar is shown in Fig. 2. A power take-off mechanism including a power take-off shaft 13 is mounted in the central gear casing 3 and is operable by the tractor motor in conformity with conventional practice, the power take-off shaft 13 being rotatable about a horizontal axis extending longitudinally of the tractor and centrally between the rear wheels 1 and 2.

The mower shown in Figs. 1 and 2 in rear of the tractor is of the semi-mounted type, that is, it is equipped with a forward hitch structure by which it is partly sustained on the tractor, and with a rear support by which it is partly sustained on the ground and independently of the tractor.

The forward hitch structure for connecting the mower in supported relation to the tractor comprises a bracket 14 and a hitch bar 16 which are hingedly connected with each other by means of two pivot bolts 17 and 18 at opposite ends, respectively, of the bracket 14. The bracket 14 is formed of a piece of strap metal, the opposite ends of which are turned up and provided with holes for mounting of the bolts 17 and 18, and the straight portion of the bracket between its upturned ends has a pair of holes for the reception of fastening bolts 19 and 21 which are passed through said holes and through registering holes in the draw bar 9 so as to detachably secure the bracket in a transversely and vertically fixed position on the tractor. The hitch bar 16 is likewise formed of a piece of strap metal which is bent into U-shape to provide forwardly extending ear portions which straddle the bracket 14 and have aligned holes for the reception of the bolts 17 and 18. The hitch bar 16 is thus connected with the tractor for pivotal movement about a horizontal transverse axis and in transversely fixed relation to the tractor; and the bolts 17 and 18 are suitably retained on the bracket 14 to provide for free pivotal movement of the hitch bar 16 about the common axis of the bolts 17 and 18.

The hitch bar 16 carries a U-shaped bracket 22 Fig. 2, which is rigidly secured, as by welding, to the hitch bar 16 Fig. 1 in proximity to the right end of the latter, that is, in proximity to the end of the hitch bar 16 which is connected to the bracket 14 by the bolt 17. The bracket 22 is formed of strap metal and extends at right angles to the hitch bar 16. The portion of the bracket 22 extending upwardly from the hitch bar 16 has a bent upper portion projecting rearwardly beyond the hitch bar 16; and the portion of the bracket 22 extending downwardly from the hitch bar 16 has a similarly bent lower portion projecting rearwardly beyond the hitch bar 16. Hingedly connected to the rearwardly projecting upper and lower portions of the bracket 22 by means of pivot bolts 23 and 24, as best shown in Fig. 2, is another bracket 26 which is substantially a duplicate of the bracket 22, an upper portion of the bracket 26 overlying the upper portion of the bracket 22 and having a hole in registry with a hole in the upper portion of the bracket 22 for the reception of the bolt 23, and the lower bent portion of the bracket 26 overlying the lower bent portion of the bracket 22 and having a hole in registry with a hole in the lower bent portion of the bracket 22 for the reception of the bolt 24. The bolts 23 and 24 are axially aligned with each other, and the bracket 26 is thus mounted for swinging movement about an axis in transversely fixed relation to the tractor.

The bracket 26 forms part of the frame structure of the mower, and it is rigidly secured, as by welding, to the forward end of a longitudinal frame member 27 which consists of a straight piece of square tubing and extends in right angle relation to the pivot axis afforded by the bolts 23 and 24. At its rear end the tubular frame member 27 carries rearwardly extending bracket straps 28 and 29 for mounting it on a castering wheel support comprising a wheel 31 and a wheel fork 32 which has a spindle portion 33 rotatably mounted in the bracket straps 28 and 29.

Rigidly secured to the frame member 27, intermediate its front and rear ends, is a depending bracket structure 34 Fig. 2 to which a drag arm 36 Fig. 1 is pivotally connected by means of a long pivot pin 37, the axis of the pivot pin 37 being disposed generally parallel to the frame member 27 and the drag arm 36 being freely swingable about said axis. Mounted on the outer end of the drag arm 36 in conventional manner is a cutter bar yoke 38 which forms part of a conventional cutting mechanism comprising a cutter bar 39, a reciprocable sickle bar 41, and an inner shoe 42, the inner shoe 42 being pivotally connected with the cutter bar yoke 38 by means of front and rear pivots 43 and 44, as best shown in Fig. 2. The yoke 38 is additionally connected with the frame structure of the mower by means of a diagonal rod 46. A pair of strap lugs 47 and 48 are welded to a lower portion of the bracket 26, and carry a pivot pin 49 which extends through an eye on the inner end of the rod 46. The cutting mechanism is thus connected with the frame structure of the mower for movement in unison with the latter about the forward pivot axis afforded by the bolts 23 and 24.

Also mounted on the depending bracket structure 34 is a flywheel 51 which carries a crank pin 52. A pitman 53 is connected with the crank pin 52 and with the sickle bar 41 in conventional manner in order to reciprocate the sickle bar upon rotation of the flywheel 51. A bearing tube 54 for the shaft of the flywheel 51 is rigidly mounted on the bracket structure 34 and a driving sheave 56 for the flywheel shaft is arranged at the rear side of the bracket structure 34 as shown in Figs. 1 and 2.

At the left side of the frame tube 27, that is, at the side thereof remote from the cutting mechanism, another bracket structure 57 Fig. 1 is mounted on the frame tube 27 and carries a bearing tube 58 for an upper drive shaft 59. A sheave 61 is secured to the upper drive shaft 59 forwardly of the bracket structure 57 and in alignment with the sheave 56 on the lower bracket structure 34, the two sheaves being drivingly connected with each other by a belt 62.

The cutting mechanism may be raised and lowered by pivotal movement of the cutter bar 39 relative to the yoke 38 about the pivots 43 and 44 and by pivotal movement of the drag arm 36 relative to the mower frame about the axis of the pivot pin 37, in conformity with conventional practice, and a suitable mechanism, not shown, may be provided for that purpose and arranged in any convenient manner. For transport purposes, the cutter bar 39 may be swung upwardly about the pivots 43 and 44 Fig. 2 on the yoke 38 and retained in an upwardly tilted position by a rod 63 which is shown in Figs. 1 and 2 and which may be moved from the position in which it is shown in these figures into an attaching position with the cutter bar 39 in order to hold the latter in an upright transport position. The rod 63 is looped to a stud 81 on the frame member 27, and as shown in Figs. 1 and 2, rests in a slot of the bracket strap 28.

Fig. 1 shows the mower in two positions behind the tractor, one, in full lines, which is the normal working position of the mower relative to the tractor and in which the cutter bar shoe 42 floatingly rides on the ground, and another position, in dotted lines, in which the frame and the cutting mechanism are angularly displaced relative to the tractor about the axis of the pivot bolts 23 and 24 so that the cutting mechanism occupies a rearwardly inclined non-working position. The front end of the mower frame 27 is connected to the hitch bar 16 by means of the pivot bolts 23 and 24 in proximity to the right end of the hitch bar 16, as stated hereinbefore, and it will be noted that in the normal working position of the mower the cutting mechanism, comprising the cutter bar 39 and the sickle bar 41, is disposed at one side of the frame member 27 whereas the portion of the hitch bar 16 which extends to the left of the bracket 22 is disposed at the other side of the frame member 27.

A spring actuated toggle mechanism is operatively interposed between the hitch bar 16 and the frame member 27 for the purpose of releasably maintaining the cutting mechanism in the normal working position in which it is shown in full lines in Fig. 1. Referring to Figs. 3 and 4, a relatively long toggle link generally designated by the reference character 64 comprises two parallel identical bars 66 which are arranged one above the other and secured together in spaced relation to each other by spacers 67 and rivets 68. A second, relatively short toggle link generally designated by the reference character 69 comprises two parallel and identical bars 71 which are arranged one above the other and secured together in spaced relation to each other by spacers 72 and rivets 73. The outer surfaces of the bars 71 are spaced from each other a slightly shorter distance than the inner surfaces of the bars 66, and the short toggle link 69 is straddled by the bars 66 of the long toggle link 64 and is pivotally connected thereto by means of a pivot bolt 74 which is surrounded by a spacer bushing 75. The free end of the short toggle link 69, remote from the pivot 74, is pivotally mounted in a U-shaped bracket 76 by means of a pivot bolt 77. The bracket 76 has two oblong holes 78 Fig. 4 in its bottom portion for the reception of two mounting bolts 79 which extend through the hitch bar 16 and are tightened so as to secure the bracket in fixed position on the hitch bar 16. The oblong holes 78 permit adjustment of the bracket 76 longitudinally of the hitch bar 16 in order to provide for horizontal angling of the frame member 27 relative to the hitch bar 16, as will be discussed more fully hereinbelow.

Referring to Fig. 2, it will be noted that the hitch bar 16 and the bracket 76 are arranged in such vertical relation to the frame member 27 that the latter is located at a higher level than the bracket 76. The free end of the long toggle link 64 remote from the pivot pin 74 extends under the frame member 27 and is pivotally connected therewith by a stud 81 which extends vertically through the frame member 27 and is rigidly secured thereto, as by welding. The downwardly projecting cylindrical portion of the stud 81 extends through aligned holes in the upper and lower bars 66 and carries a nut 82 at its lower end to secure the toggle link 64 against axial separation from the stud 81.

Designating the pivotal connection between the frame 27 and the hitch bar 16 by means of the pivot bolts 23 and 24 as a first pivot center, and the pivotal connection between the toggle links 64 and 69 at 74 as a second pivot center, and further designating the pivotal connection of the short toggle link 69 with the hitch bar 16 at 77 as a third pivot center and the pivotal connection of the long toggle link 64 with the frame 27 at 81 as a fourth pivot center, it will be noted that in the position of the toggle mechanism as shown in full lines in Figs. 1 and 3, said second pivot center at 74 occupies a position in close proximity to a line through the third and fourth pivot centers 77 and 81. In the mentioned full line position, the toggle links 64 and 69 are disposed at a slight angle relative to each other, which is preferably about three degrees, and the toggle links are prevented from moving into dead center relation, that is, into exact alignment with each other, by stops 83 which are formed, respectively, on the upper and lower bars 71 of the short toggle link 69 and which are laterally abuttable with the spacer 67 of the long link 64, next to the pivot 74, as best shown in Figs. 3 and 4. In other words, engagement of the stops 83 with the mentioned spacer 67 determines the toggle position in which the links 64 and 69 are shown in full lines in Figs. 1 and 3, and while the links 64 and 69 are prevented by said engagement of the stops 83 with the mentioned spacer 67 from overtraveling said toggle position they are free to break away from said toggle position into the folded position in which they are shown in dotted lines in Figs. 1 and 3.

It will be further noted that in the toggle position of the links which is determined by engagement of the stops 83 with the mentioned spacer 67 the second pivot center at 74 is located in rear of a line through the third and fourth pivot centers at 77 and 81, that is, at the side of said line remote from said first pivot center at 23.

The toggle links 64 and 69 are urged into the toggle position in which they are shown in full lines in Figs. 1 and 3 by a coil spring 84 which is anchored at one end thereof on the intermediate spacer 67 of the toggle link 64 and at the other end on a U-bolt 86 which is mounted on the hitch bar 16 intermediate the brackets 22 and 76. The legs of the U-bolt extend slidably through a pair of holes in the hitch bar 16, and the tension of the spring 84 may be adjusted by means of nuts 87 on the threaded legs of the U-bolt 86.

The provision of the bracket 14 and of the hitch bar 16, together with its bracket 22, affords a predetermined transverse relation between the first pivot center at 23 and the tractor, and the provision of the bracket 76 on the hitch bar 16 affords a reaction point for the toggle link 69 in transversely fixed relation to the tractor and at a predetermined horizontal distance from the first pivot center at 23. The vertical stud 81 on the frame member 27 provides a reaction point for the toggle link 64 on the frame 27 in horizontally spaced relation to the first pivot center at 23, and the toggle mechanism is automatically operative to establish a bracing connection between said reaction points upon horizontal swinging movement of the frame 27 into the predetermined angular position relative to the tractor in which it is shown in full lines in Figs. 1 and 3. Upon establishment of said bracing connection the toggle links function as a compression brace between the frame member 27 and the hitch bar 16 in order to maintain the cutting mechanism in its normal working position. The toggle mechanism is further automatically operative to disable said bracing connection under certain conditions, namely, when the frame 27 becomes subject to a turning force which subjects the frame to horizontal swinging movement about the first pivot center at 23 in a direction to shorten the spacing between the reaction points at 77 and 81, and more particularly when such turning force exceeds a certain limit which is determined by the tension of the spring 84.

The toggle mechanism is arranged in such a manner as stated, that when the cutting mechanism is located in its normal working position, as shown in full lines, the second pivot center at 74 is located in close proximity to the dead center line through the pivot connection at 77 on the hitch bar 16 and the pivot connection at 81 on the frame 27, and said arrangement further enables said toggle mechanism to exert a relatively high initial resistance against swinging movement of the frame 27 and the cutting mechanism 39, 41 from the full line position shown in Fig. 1 into the dotted line position in which the cutting mechanism occupies a rearwardly inclined non-working position. This initial resistance may be adjusted by increasing or decreasing the tension of the coil spring 84, that is, by adjustment of the nuts 87 on the U-bolt 86.

When the cutter bar 39, in its normal working position, is driven against an obstruction beyond which it cannot be advanced by the tractor, as for instance against a rock or fence post, the resulting increased thrust upon the toggle links 64 and 69 will cause the latter to break away from their full line toggle position towards the folded position which is indicated in dotted lines in Figs. 1 and 3. During such movement of the toggle links the coil spring 84 will be somewhat elongated and, as a result, the coil spring will dampen the break-back movement of the cutting mechanism. Such break-back movement of the cutting mechanism may continue until the toggle link 69 hits a stop 88 which is secured to the hitch bar 16 at the left end of the latter, that is, at the end thereof which is connected to the bracket 14 by means of the pivot bolt 18. In order to recondition the mower for normal operation, after a break-back, it is only necessary to drive the tractor for a short distance in reverse while the cutting mechanism is left in contact with the ground. While the frame and cutting mechanism are being manipulated from the dashed line position to the full line position shown in Fig. 1, by reverse movement of the tractor, the tension of the coil spring 84 will be effective to assist such return movement of the frame and cutting mechanism into the normal operating position.

When the cutting mechanism is raised to an upright transport position, as has been mentioned hereinbefore, the weight of the cutting mechanism subjects the frame to a lateral tilting load which tends to displace the frame torsionally relative to the hitch bar 16. Under these and similar conditions which may arise during operation of the mower, the lateral tilting load is transmitted to the hitch bar 16 not only through the pivot bolts 23 and 24, but also through the toggle links 64, 69. In other words, the toggle mechanism functions to stabilize the frame against torsional displacement relative to the hitch bar 16, and said stabilizing function of the toggle mechanism is obtained by mounting the links 69 and 64, as described hereinbefore, in horizontally swingable and vertically non-swingable relation to each other and to the hitch bar 16 and frame member 27, respectively.

As stated hereinbefore, the bracket 76 for the short toggle link 69 is adjustable longitudinally of the hitch bar 16 in order to provide for horizontal angling of the frame member 27 relative to the hitch bar 16. It will now be seen that when the links 64 and 69 are in their full line toggle position, and when the bracket 76 is adjusted to a position in closer proximity to the bracket 22, the frame member 27 will be swung about the axis of the pivot bolts 23 and 24 towards the right, and consequently the spindle 33 of the caster wheel support at the rear end of the mower frame will be moved towards the right side of the tractor. Incidentally, the cutter bar 39 will also be swung about the axis of the pivot bolts 23 and 24, and the lead of the cutter bar will thereby be increased. On the other hand, adjustment of the bracket 76 towards the left of the bracket bar 16, that is, farther away from the axis of the pivot bolts 23 and 24, will move the spindle 33 of the caster wheel support towards the left of the tractor, and the lead of the cutter bar 39 will be decreased by such adjustment of the bracket 76. After the spindle 33 of the caster wheel support has been brought to the proper position, by adjustment of the bracket 76 longitudinally of the hitch bar 16, which will insure proper tracking of the caster wheel 31 in normal operation, the lead of the cutter bar may be adjusted, if desired, by an independent adjusting mechanism of conventional construction which is operatively interposed between the cutter bar yoke 38 and the cutter bar shoe 42, and which is generally indicated in Fig. 1 by the reference character 90.

A power transmitting connection between the power take-off shaft 13 on the tractor and the upper drive shaft 59 on the mower comprises a pair of telescopically connected shaft sections 89 and 91 which are connected, respectively, with the power take-off shaft 13 by a universal joint 92 and with the upper drive shaft 59 on the mower by means of a universal joint 93. It will be noted that when the frame and cutting mechanism move from the full line position to the dotted line position shown in Fig. 1, the distance between the upper drive shaft 59 on the mower frame and the power take-off shaft 13 on the tractor becomes shorter and such shortening of the distance between the two shafts is accommodated by forward sliding movement of the shaft section 91 within the tubular shaft section 89.

Features and advantages of the present invention will be apparent from the foregoing description of an embodiment of the invention in a tractor mower; but it is to be understood that it is not desired to limit the invention to the particular form and details described hereinabove and that the invention includes such other forms and modifications as are embraced by the scope of the annexed claims.

It is claimed and desired to secure by Letters Patent:

1. A mower comprising a mounting structure adapted to support a cutting mechanism positionable in laterally disposed relation thereto, a hitch structure for connecting said mounting structure with a source of draft, pivot means connecting said hitch and mounting structures with the latter disposed in trailing, horizontally swingable relation to the former, and a pair of pivotally connected links forming a toggle joint uniting portions of said hitch and mounting structures spaced, respectively, horizontally sideward and horizontally rearward from said pivot means, and means operatively associated with said links and acting to maintain said links in a limiting position affording a predetermined high initial resistance to a horizontal swinging movement of said mounting structure relative to and toward said hitch structure.

2. A pull type mower comprising a frame structure adapted to support a cutting mechanism positionable in laterally disposed relation thereto, a hitch structure connectable in trailing relation to a source of draft, pivot means connecting said hitch and frame structures with the latter disposed in trailing, horizontally swingable relation to the former, a pair of pivotally connected links forming a toggle joint uniting portions of said hitch and frame structures spaced, respectively, horizontally sideward and horizontally rearward from said pivot means, and means operatively associated with said links and continuously acting to pull said links toward said hitch structure and into a limiting position wherein said links act as a brace securing said frame structure in releasably fixed, trailing relation to said hitch structure.

3. A pull type mower comprising a frame structure adapted to support a cutting mechanism positionable in laterally disposed relation thereto, a hitch structure connectable in trailing relation to a source of draft, pivot means connecting said hitch and frame structures with the latter disposed in trailing, horizontally swingable relation to the former, a pair of pivotally connected links forming a toggle joint uniting portions of said hitch and frame structures spaced, respectively, horizontally sideward and horizontally rearward from said pivot means, and means operatively associated with said links and continuously acting to pull said links toward said hitch structure and into a limiting position approaching a straight line relation forming one side of a generally triangular structure wherein said links act as a brace securing said frame structure in releasably fixed, trailing relation to said hitch structure.

4. A pull type mower comprising a frame structure adapted to support a cutting mechanism positionable in laterally disposed relation thereto, a hitch structure connectable in trailing relation to a source of draft, pivot means connecting said hitch and frame structures with the latter disposed in trailing, horizontally swingable relation to the former, a pair of pivotally connected links forming a toggle joint uniting portions of said hitch and frame structures spaced, respectively, horizontally sideward and horizontally rearward from said pivot means, and means operatively associated with said links and acting to retain said links in a limiting position wherein the pivot connection between said links is disposed immediately to the rear of a straight line passing through the portions of said links united with said frame and hitch structures as long as the force tending to swing said frame structure toward said hitch structure is less than a predetermined amount, said last mentioned means and links being thereby operative to brace and maintain said frame structure in releasably fixed, trailing relation to said hitch structure.

5. A mower comprising a hitch structure adapted for mounting on a source of draft, a frame structure pivotally connected at a first pivot center with said hitch structure for horizontal swinging movement relative thereto, a pair of links pivotally connected with each other at a second pivot center and with said hitch and frame structures at third and fourth pivot centers, respectively, affording horizontal swinging movement of said links and frame structure relative to each other and relative to said hitch structure, resilient means associated with said links in a manner operative to urge said links toward said hitch structure and into a limiting position approaching a straight line relation of the links, stop means for preventing said links from over-traveling said limiting position under the action of said resilient means, other stop means operative to limit movement of said frame structure about said first pivot center in a direction toward said third pivot center, and cutting mechanism carried by said frame structure and positionable in laterally disposed relation to the side thereof remote from said third pivot center so as to occupy a normal working position while said links are in said limiting position.

6. A mower comprising a hitch structure adapted for mounting on a source of draft, a frame structure pivotally connected at a first pivot center with said hitch structure for horizontal swinging movement relative thereto, a pair of links pivotally connected with each other at a second pivot center and with said hitch and frame structures at third and fourth pivot centers, respectively, affording horizontal swinging movement of said links and frame structure relative to each other and relative to said hitch structure, stop means limiting movement of said links in a direction to position said second pivot center in close proximity to a straight line passing through said third and fourth pivot centers, resilient means associated with said links in a manner operative to urge said links toward said hitch structure and into a limiting position as determined by said stop means, other stop means operative to limit movement of said frame structure about said first pivot center in a direction approaching said third pivot center, and cutting mechanism carried by said frame structure and positionable in laterally disposed relation to the side thereof remote from said third pivot center.

7. A tractor-mower comprising an elongated frame member, a cutting mechanism operatively mounted on said member for horizontal swinging movement in unison therewith and being positionable to extend laterally outward from one side of said member, a hitch bar pivotally connected with a portion of said member in advance of said cutting mechanism and extending laterally outward beyond the other side of said member, said pivot connection affording horizontal swinging movement of said member relative to said hitch bar, a pair of links pivotally connected together and forming a toggle joint uniting a portion of said hitch bar disposed laterally outward from said other side of said member in horizontally spaced relation to said pivot connection with a portion of said member disposed horizontally rearward from said pivot connection, said frame member and links being horizontally swingable relative to each other and relative to said hitch bar into a limiting position wherein the pivot connection between said links is disposed immediately to the rear of a straight line passing through the portions of said links pivotally united with said frame member and hitch bar, and means operatively associated with said links for retaining same in said limiting position as long as the force tending to swing said frame toward said hitch bar remains less than a predetermined amount, said means and links being thereby operative to brace and maintain said frame member in releasably fixed, trailing relation to said hitch bar.

8. In a tractor-mower having an elongated frame member and having a cutting mechanism operatively mounted on said member for horizontal swinging movement in unison therewith and being positionable to extend laterally outward from one side of said member, an improved break-back hitch means for connecting said frame member in trailing relation to a tractor and comprising a hitch bar pivotally connected with a portion of said member in advance of said cutting mechanism and affording horizontal swinging movement of said member about a generally vertical axis afforded by said pivot connection, said hitch bar extending transversely of said member and laterally outward beyond the other side thereof, a pair of pivotally connected links forming a toggle joint pivotally uniting a portion of said hitch bar disposed laterally outward from said other side of said member in horizontally spaced relation to said vertical axis with a portion of said frame disposed horizontally rearward from said vertical axis, said frame member and links being horizontally swingable relative to each other and relative to said hitch bar into a limiting position wherein the pivot connection between said links is disposed to the rear of and adjacent a straight line passing through the portions of said links pivotally united with said frame member and hitch bar, and means operatively associated with said links for retaining same in said limiting position as long as the force tending to swing said frame toward said hitch bar remains less than a predetermined amount, said means and links being thereby operative to brace and maintain said frame member in releasably fixed, trailing relation to said hitch bar.

9. A tractor-mower comprising an elongated frame member, a cutting mechanism operatively mounted on said member for horizontal swinging movement in unison therewith and being positionable to extend laterally outward from one side of said member, a hitch bar pivotally connected with a portion of said member in advance of said cutting mechanism and extending laterally outward beyond the other side of said member, said pivot connection affording horizontal swinging movement of said member relative to said hitch bar, a pair of links pivotally connected together and forming a toggle joint uniting a portion of said hitch bar disposed laterally outward from said other side of said member in horizontally spaced relation to said pivot connection with a portion of said member disposed horizontally rearward from said pivot connection, said frame member and links being horizontally swingable relative to each other and relative to said hitch bar, resilient means operatively associated with said links and continuously acting to pull same toward said hitch bar and into a limiting position wherein said links act as a brace securing said frame in releasably fixed, trailing relation to said bar.

10. A tractor-mower comprising an elongated frame member, a cutting mechanism operatively mounted on said member for horizontal swinging movement in unison therewith and being positionable to extend laterally outward from one side of said member, a hitch bar pivotally connected with a portion of said member in advance of said cutting mechanism and extending laterally outward beyond the other side of said member, said pivot connection affording horizontal swinging movement of said member relative to said hitch bar, a pair of links pivotally connected together and forming a toggle joint uniting a portion of said hitch bar disposed laterally outward from said other side of said member in horizontally spaced relation to said pivot connection with a portion of said member disposed horizontally rearward from said pivot connection, said frame member and links being horizontally swingable relative to each other and relative to said hitch bar, and resilient means operatively associated with said links and continuously acting to pull same toward said hitch bar and into a limiting position approaching a straight line relation forming one side of a generally triangular structure wherein said links act as a brace securing said frame member in releasably fixed, trailing relation to said hitch bar.

WILLARD H. TANKE.

REFERENCES CITED

The following references are of record in the file of this patent:

UNITED STATES PATENTS

| Number | Name | Date |
|---|---|---|
| Re. 21,734 | Crumb et al. | Mar. 4, 1940 |
| 843,993 | Breen | Feb. 12, 1907 |
| 917,603 | Hench | Apr. 6, 1909 |
| 2,198,910 | Everett | Apr. 30, 1940 |
| 2,284,003 | Luppert | May 26, 1942 |
| 2,331,863 | Schroeppel | Oct. 12, 1943 |
| 2,332,719 | Hilblom | Oct. 26, 1943 |
| 2,375,025 | Mott | May 1, 1945 |